(12) United States Patent
Hsiang-Hui (10) Patent No.: US 6,899,599 B1
(45) Date of Patent: May 31, 2005

(54) MANUFACTURING PROCESS TO MAKE A VALVE BALL

(76) Inventor: Chiang Hsiang-Hui, P.O. Box 697, Fongyuan City, Taichung County (TW) 420

( * ) Notice: Subject to any disclaimer, the term of this patent is extended or adjusted under 35 U.S.C. 154(b) by 0 days.

(21) Appl. No.: 10/852,564

(22) Filed: May 25, 2004

(51) Int. Cl.⁷ .................................................. B24B 7/19

(52) U.S. Cl. ...................... 451/50; 451/58; 251/315.16

(58) Field of Search ............................. 451/49, 57, 58, 451/178, 292, 296, 50; 251/315.16; 29/870.132

(56) References Cited

U.S. PATENT DOCUMENTS 5,380,184 A * 1/1995 Von Holdt, Sr. ............. 425/547
5,979,873 A * 11/1999 Wu ........................ 251/315.16

* cited by examiner

Primary Examiner—Eileen P. Morgan (57) ABSTRACT

A manufacturing process to make a ball valve of the present invention includes the following steps: a) prepare flat circular metallic plates each of which has a rectangular indentation in a circumference; b) mold those plates into bowl shape; c) remove the circular bottom of the bowl shapes to reform a hemi-spherical shape by another mold; d) weld each pair of the hemi-spherical shapes into a spherical shape each of which has a pair of aligned openings and a lateral rectangular through hole; e) trim and grind the uneven connection seam; and f) polish and smooth the outer surface to finished a qualified ball valve which has uniform arc and thickness.

5 Claims, 11 Drawing Sheets

MANUFACTURING PROCESS TO MAKE A VALVE BALL

BACKGROUND OF THE INVENTION

The present invention relates to hydroelectric apparatus and more particularly to a manufacturing process to make a ball valve which is capable of rapidly and precisely to make shape of a ball valve.

Figure 10:
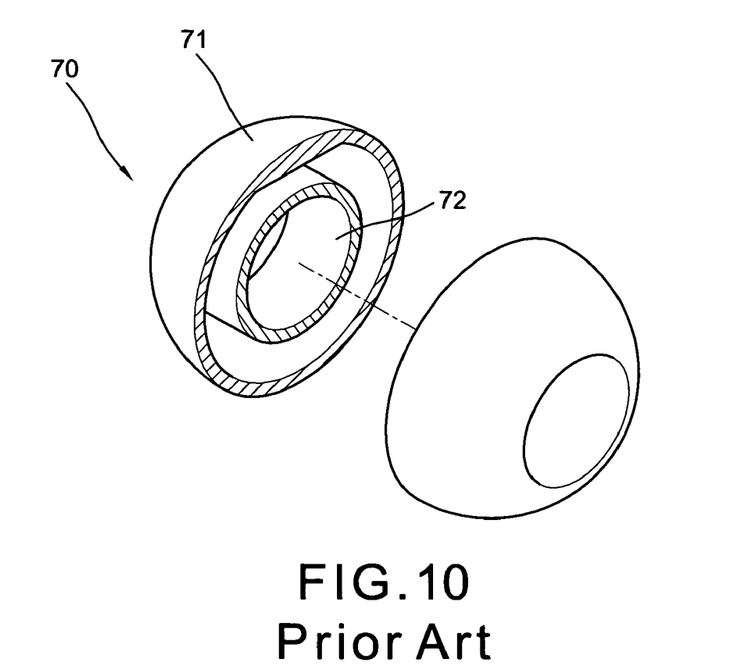
FIG. 10 is a perspective view to show a prior art ball valve is made up with forging process.

As we know that the ball valve is popularly used to the switches. The manufacturing process of the ball valve is categorized as forging, punching and/or roller ramming. FIG. 10 shows a prior art manufacturing process of a ball valve 70 which is adapting the roller ramming process by forging a pair of semi-spherical shapes 71 and welding them together into a ball shape and then making a central passageway by a punching bar. However, this process costs more than others because it has to deal with epidermis chemical disposal and the spherical trimming procedure. Besides, the residual chemical remained on the surface of the ball valve may harm human health. So that this process is now being abandoned.

Figure 11:
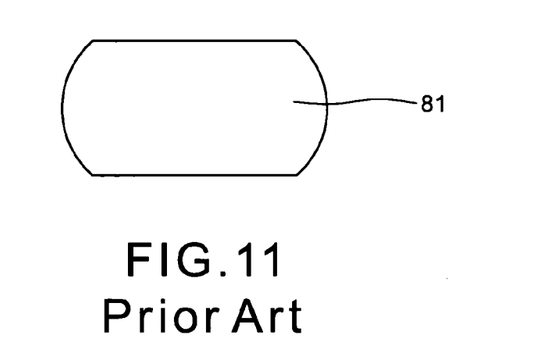
FIGS. 11 to 13 are the plane views and a perspective view to show another prior art ball valve made up with punching process.
Figure 12:
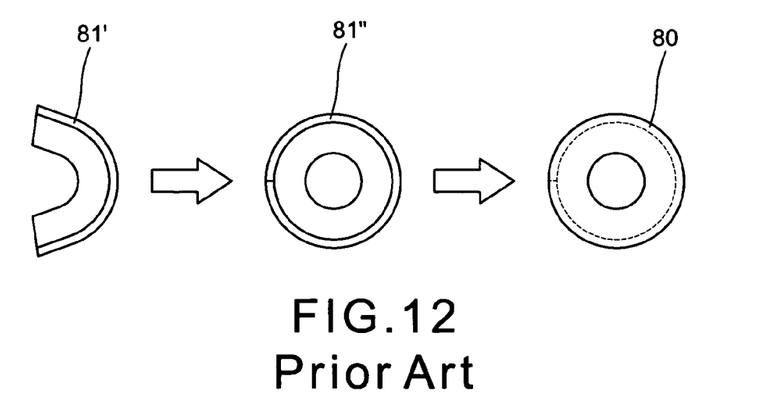
Figure 13:
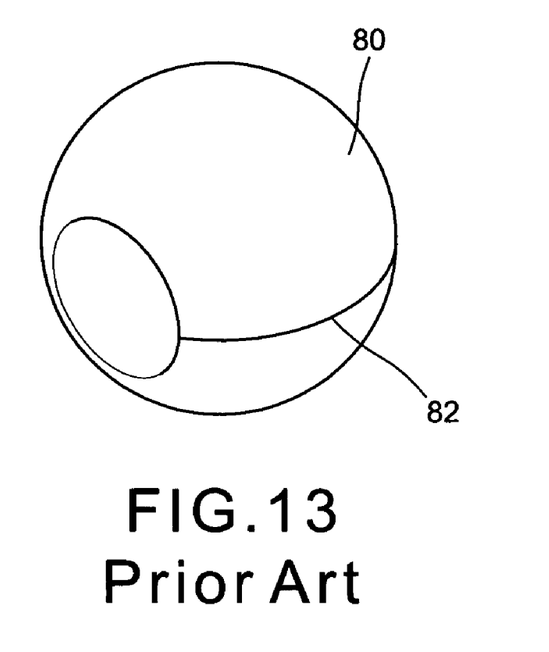
Figure 14:
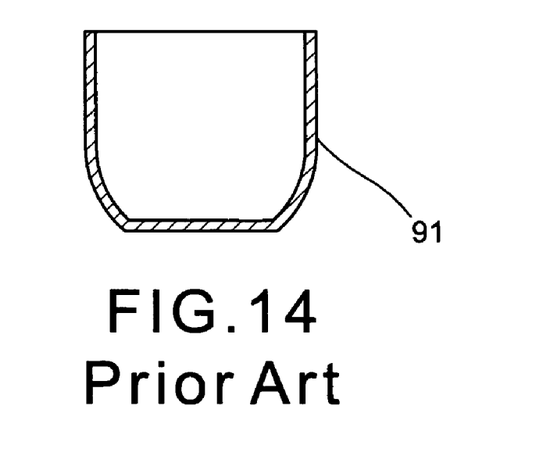
FIGS. 14 to 17 are the sectional views to show a still another prior art ball valve made up with punching process.
Figure 15:
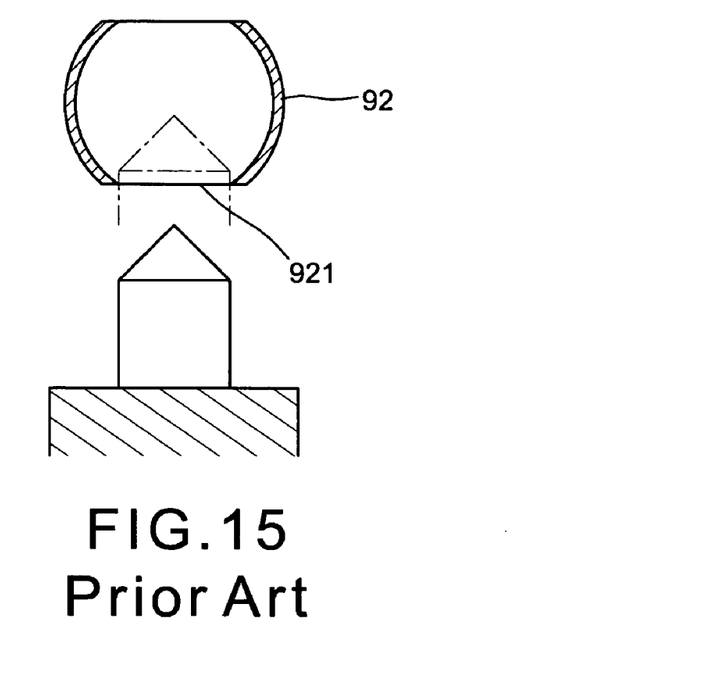
Figure 16:
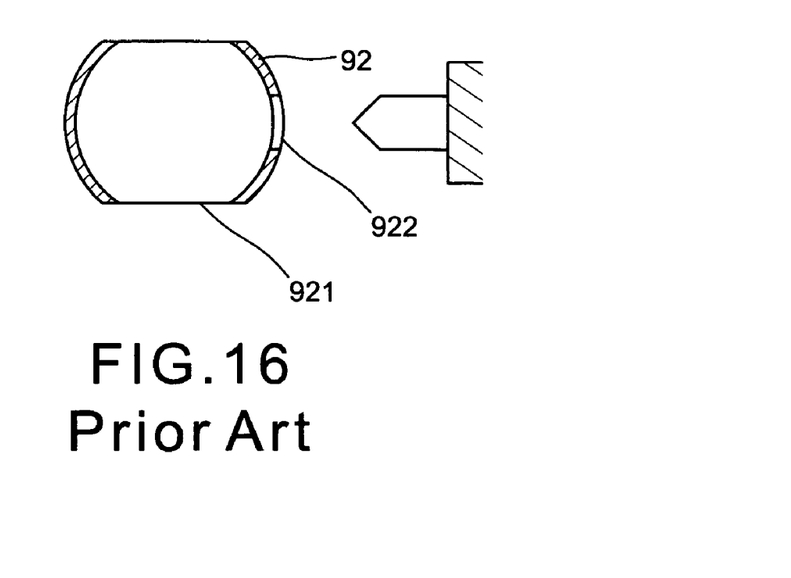
Figure 17:
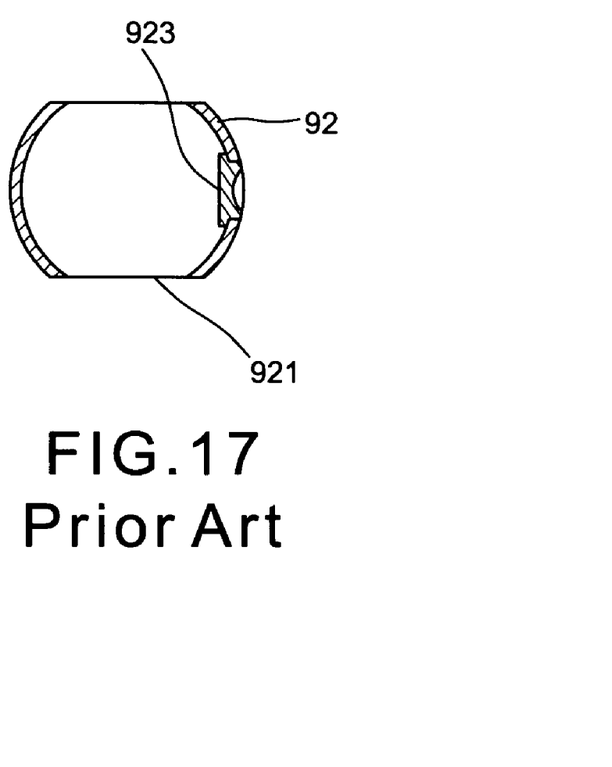
Figure 18:
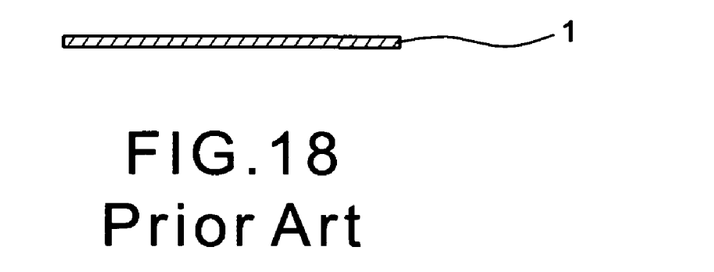
FIGS. 18 to 22 are the sectional and perspective views to show a further prior art ball valve made up with roller ramming process.
Figure 19:
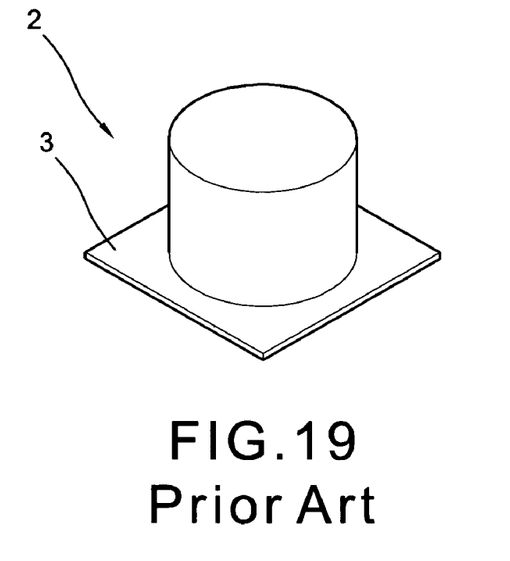
Figure 20:
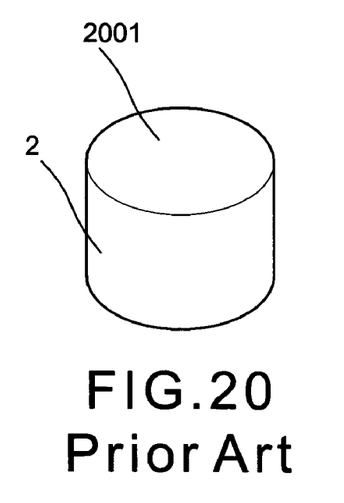
Figure 21:
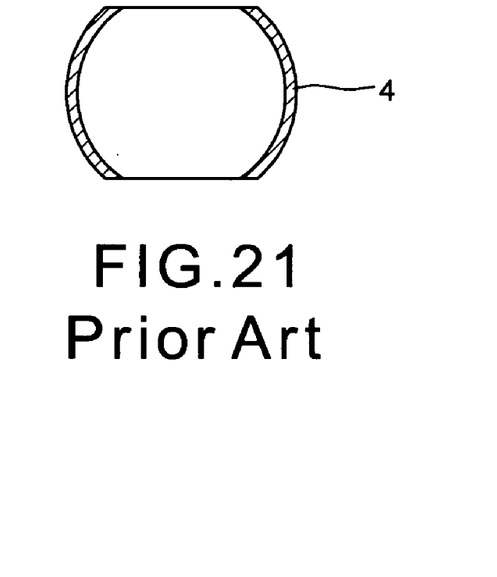
Figure 22:
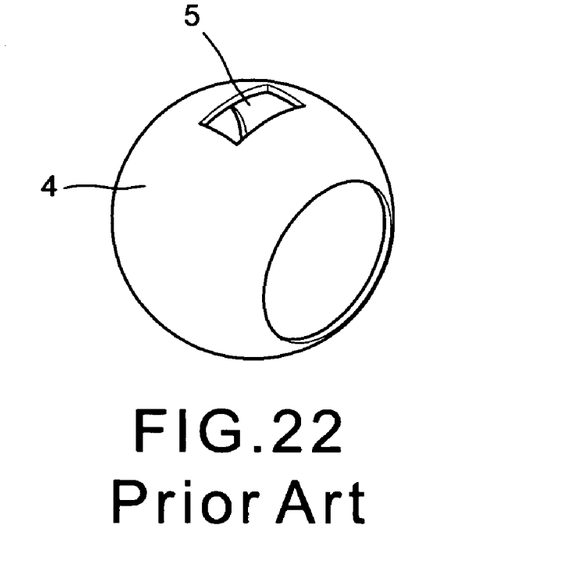

FIGS. 11, 12 and 13 indicate another prior art process which is adapted a steel plate 81 and punches the steel plate 81 into pieces of small arcuate sheet 81' at first, secondly, punches the small arcuate sheet 81' into a large arcuate sheet 81" and then presses the large arcuate sheets 81' into the hemi-spherical shapes 80 by an upper and a lower molds. Finally, weld their coupling rims 82 together on pair by pair basis. This process is somewhat complicated due to its repeated punching activities and has to weld the hemispherical shapes together before removing of the upper and lower molds.

FIGS. 14 to 17 show still another prior art process which punches a plate into a cup shaped semi-finished product 91 at first and punches the semi-finished products into a similar spherical shapes 92. Then make an upper, a lower openings 921 and a lateral through hole 922 by punching or drill method. Due to that the openings 921 punched by the upper and lower molds may create protrudent stripes and the lower rim of the cup shape semi-finished product becomes thinner than the other portions of the ball valve that causes the ball valve in uneven thickness in addition to that the protrudent stripes are to be dealt with. So that this process always cause great defective proportion, than other process.

Referring to FIGS. 18 to 22, a further prior art process of manufacturing a ball valve is shown. This process is to punch a plate 1 into a hollow cylindrical shape 2 and a flap 3 which must be removed later, to accomplish a hollow cylindrical shape 2 and a bottom 2001 which is then cut off to remain the hollow cylindrical shape 2 only, next step is to make the cylindrical shape 2 into a ball shape 4 by roller ramming method. Finally makes a rectangular through hole 5 in a periphery of the ball shape 4. So that a ball valve is therefore finished. However, this process requires twice cutting procedures and the thickness of the ball is not so even. Besides, the circular measure is always not symmetrical such that the result is not qualified.

The above discussed prior art manufacturing processes have a common disadvantage that the connection hole for linking a valve stem is punched after the configuring of the ball valve that may cause a deformation of the ball valve that not only affects a perfect connection of the valve stem with the ball valve but also face the leakage of the water and/or the air.

SUMMARY OF THE PRESENT INVENTION

The present invention has a main object to provide a manufacturing process to make a ball valve which process is rapid and precise. The result will be in good quality in uniform thickness and circular measure. Therefore, a high qualified proportion in addition to a ready assembly become feasible.

Accordingly, the manufacturing process to make a ball valve of the present invention comprises generally the following steps:
  a) prepare a pair of circular flat metallic plate and punch a rectangular indentation in a predetermined position of the circumference of the plate;
  b) put the circular plate onto an upper and a lower molds and punches by a punching means to form a bowl shaped configuration;
  c) punch the bowl shaped configuration again to remove the flat portion and form it into an indented hemi-spherical shape;
  d) combine two indented hemi-spherical shaped member together by welding means to make a ball valve and their indentations are aligned with each other to form a rectangular retaining through hole which is provided to connect a valve stem;
  e) polish the connection seam on the valve.

Therefore, a ball valve of uniform thickness is rapidly and precisely finished.

The present invention will become more fully understood by reference to the following detailed description thereof when read in conjunction with the attached drawings.

DETAILED DESCRIPTION OF THE PREFERRED EMBODIMENT

Figure 1:
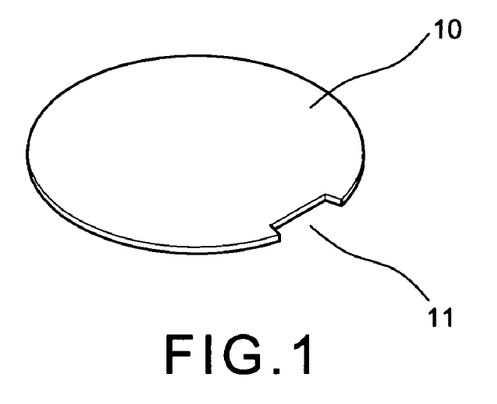
FIG. 1 is a perspective to show a flat circular plate of the present invention.
Figure 2:
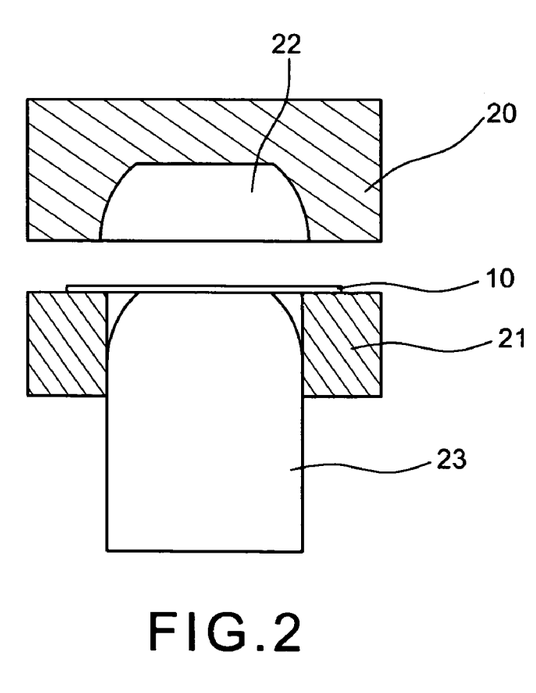
FIG. 2 is a sectional view to show an upper and a lower mold in a punch machine.
Figure 3:
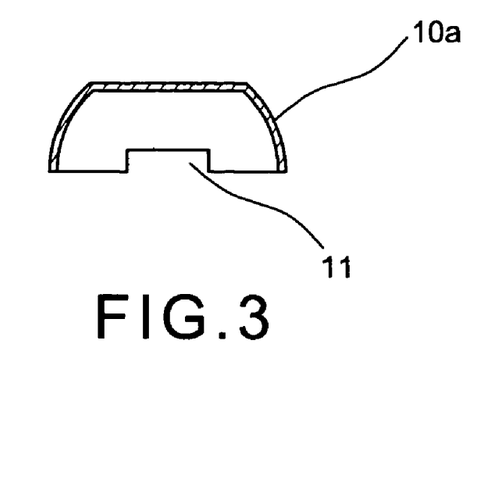
FIG. 3 is a sectional view to show that the flat circular plate is punched into an indented bowl shape.
Figure 4:
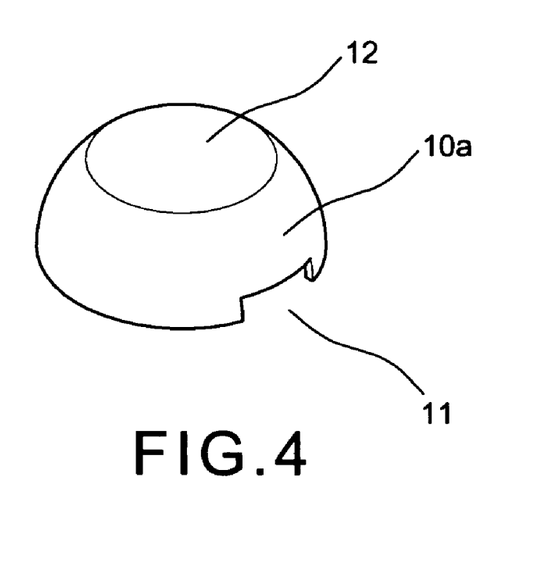
FIG. 4 is a perspectively view of FIG. 3.
Figure 5:
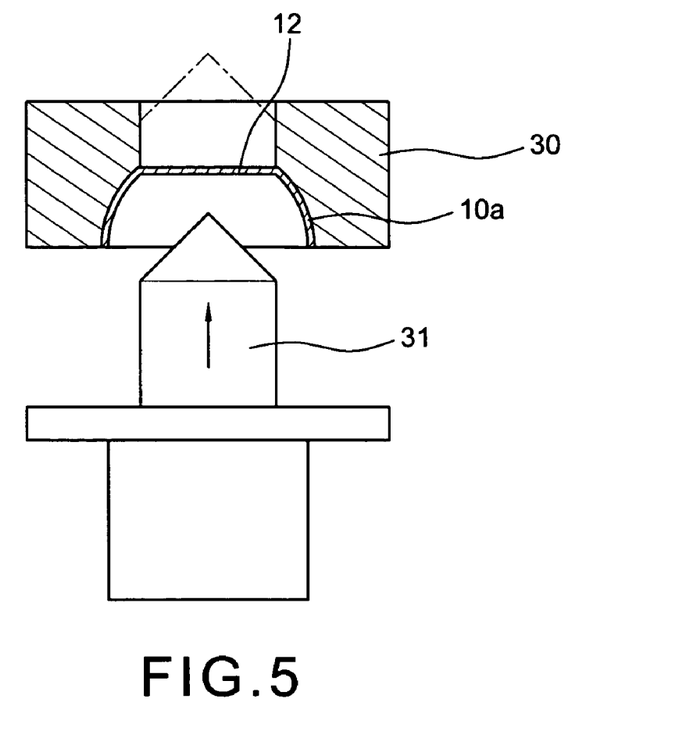
FIG. 5 is a sectional view to show the flat bottom of the bowl shape being punched off.
Figure 6:
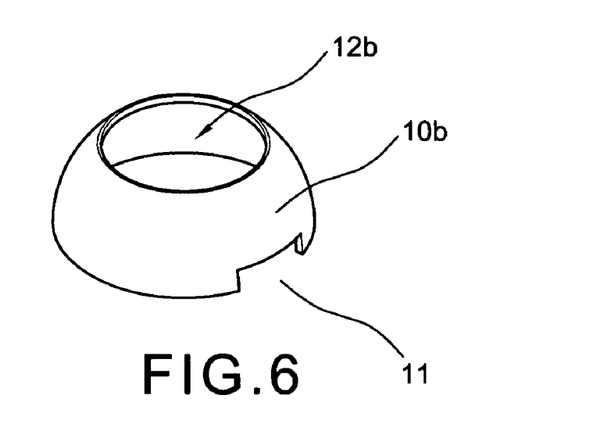
FIG. 6 is a perspective view to show that the semi-product of the present invention is punched into a hemi-spherical shape.
Figure 7:
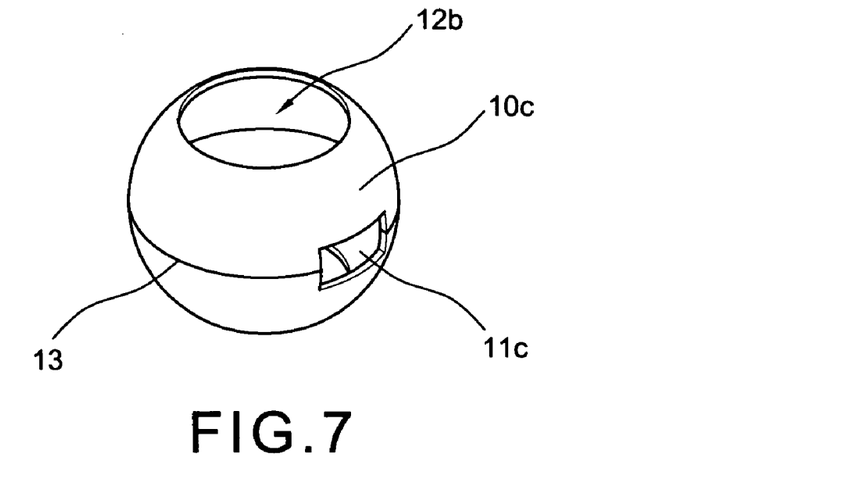
FIG. 7 is a perspective view to show that a pair of corresponding hemi-spherical shape semi-products are welded into a ball valve.
Figure 8:
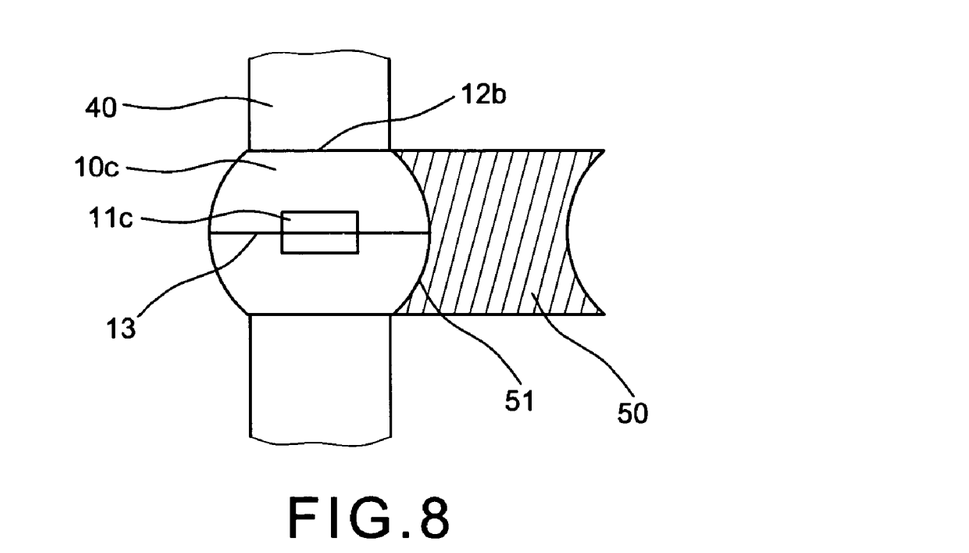
FIG. 8 is a sectional view to show that the connection seam on the valve is polishing by a grinder.
Figure 9:
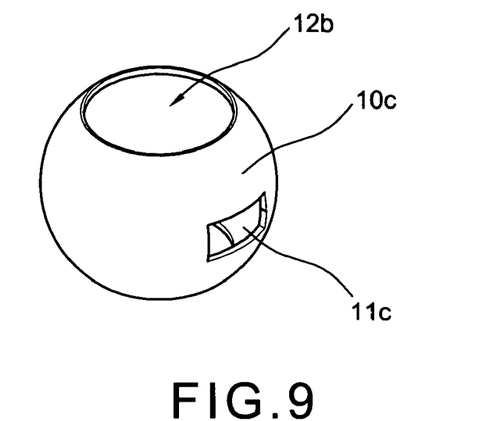
FIG. 9 is a perspective view to show a finished ball valve of the present invention.

With reference to FIGS. 1 and 2 of the drawings, the manufacturing process to make a ball valve of the present invention comprises the following steps:

a) prepare a pair of flat circular metallic plates 10 and each of the plates 10 has a roughly rectangular indentation 11 in a predetermined position of its circumference;

b) put the flat circular metallic plate 10 on one by one basis, on a lower mold 21 which has a punch 23 slidably disposed in the center and incorporates with an upper mold 20 which is moving downward onto the plate 10. Then striking the punch 23 upward to form the circular plate into a bowl shape piece 10a due to that a bowl shaped depression 22 formed in the upper mold 20. The bowl shape piece 10a has an indentation 11 in a lower rim and a circular bottom 12 on the specific surface (as shown in FIGS. 3 and 4);

c) place the bowl shape piece 10a into a semi-circular mold 30 (as shown in FIGS. 5 and 6), and use a sharp punch bar 31 to punch the bottom 12 of the bowl shaped piece becoming a circular opening 12b. The bowl shape piece 10a which is already punched into hemi-spherical shaped configuration that will not be deformed due to the inner semi-circular depression of the semi-circular mold 30 which has the function of stability;

d) combine two hemi-spherical shaped configurations 10b with their indentations 11 engaged with each other. Then weld them together to complete a spherical ball valve 10c. Meanwhile, the two indentations 11 are aligned together to form a rectangular retaining through hole 11c (as shown in FIG. 7) which is provided to connect a valve stem (not shown);

e) trim and grind the uneven connection seam 13 and perform a global shaped solidification method disposal;

f) polish the outer surface of the ball valve 10c by inserting a rotatable cylindrical bar 40 through the aligned openings 12b and use a polish machine 50 which has an inward curved semi-circular surface 51 on a lateral side engaged with the outer surface of the ball valve 10c. When rotates the bar 40, the ball valve 10c is being polished until the outer surface of the ball valve 10c becoming smooth (as shown in FIG. 8). Then removes the cylindrical bar 40, a qualified ball valve 10c of the present invention is therefore finished (as shown in FIG. 9).

Base on the above process, the ball valve 10c of the present invention is combined with a pair of corresponding semi-spherical shaped configuration 10b. So that the result should be in uniform arc and thickness which insures a good quality and reliability. Not as the prior arts manufacturing processes that use only one piece of steel plate and manufactured through repeated strokes to form a valve ball that must be in uneven thickness and different arc, especially the high defective products are unavoidable. Nevertheless, though some of the producers previously forge a pair of corresponding hemi-spherical shaped pieces and then weld them together to finish a ball valve (as shown in FIG. 10). But a forged product has to finish through chemical disposal. That the residual chemical still remains in the surface of the ball valve. Further, the rectangular retaining through hole 11c of the ball valve 10c of the present invention is formed at the beginning. So it don't have to be punched after the accomplishment of the ball valve 10c. Thus, avoid a deformation of the products in comparison with the prior art manufacturing process.

Note that the specification relating to the above embodiment should be construed as an exemplary rather than as a limitative of the present invention, with many variations and modifications being readily attainable by a person of average skill in the art without departing from the spirit or scope thereof as defined by the appended claims and their legal equivalents.

I claim:

1. A manufacturing process to make a ball valve comprising the following steps:

a) preparing a pair of flat circular metallic plates each of which has a rectangular indentation in a predetermined position along a circumferential edge thereof;

b) putting said plates on one by one basis between an upper mold and a lower mold in a punching machine, said plate being punched into a bowl shaped semi-finished product each of which has a rectangular indentation in a rim and a circular bottom on specific surface;

c) placing each of said bowl shaped semi-finished products in a semi-circular shaped mold and using a sharp punch bar to punch said circular bottom of each bowl shaped semi-product into a circular opening and said bowl shaped semi-products into a piece of hemi-spherical shaped semi-finished products;

d) combining each pair of said hemi-spherical shapes together to complete a spherical shaped ball valve by welding means and their indentations being aligned with each other to form a rectangular retaining through hole which is provided to connect a valve stem;

e) trimming and grinding uneven connection seam of each ball valve and performing a global shaped solidification method;

f) polishing outer surface of each of said ball valve by inserting a rotatable cylindrical bar through aligned circular openings and adapting a polish machine which has an inward curved semi-circular surface in a lateral side engaged with outer surface of said ball valve and rotating said bar to polish said ball valve until that the surface of said ball valve becomes smooth, then removes said bar;

whereby, a qualified valve ball is therefore finished.

2. The manufacturing process as cited in claim 1, wherein said upper mold in step b has a bowl shaped depression in center.

3. The manufacturing process as recited in claim 1, wherein said lower mold has a slidable punch bar in center engageable with the bowl shaped depression in said upper mold.

4. The manufacturing process as recited in claim 1, further has a semi-circular mold in corporation with an upward shaped punching bar in step c to punch the circular bottom of each of said bowl shaped pieces into a circular opening and a semi-circular shaped configuration of the valve.

5. The manufacturing process as recited in claim 1, wherein said polishing machine in step f is of conventional.

* * * * *